May 21, 1957 W. P. GALLAGHER 2,793,307
MOTOR CONSTRUCTION
Filed Sept. 23, 1955 2 Sheets-Sheet 1

INVENTOR.
William P. Gallagher,
BY
Robert R. Lockwood
Atty

May 21, 1957　　　W. P. GALLAGHER　　　2,793,307
MOTOR CONSTRUCTION

Filed Sept. 23, 1955　　　　　　　　　　　2 Sheets-Sheet 2

| COVER | OUTER POLE MEMBER | ROTOR | POLE TIP CENTERING RING | INNER POLE MEMBER AND CORE | WINDING | PLATE AND GEAR HOUSING |

INVENTOR.
William P. Gallagher,
BY
Robert R. Lockwood
Atty.

United States Patent Office 2,793,307
Patented May 21, 1957

2,793,307

MOTOR CONSTRUCTION

William P. Gallagher, River Forest, Ill., assignor to International Register Company, Chicago, Ill., a corporation of Illinois Application September 23, 1955, Serial No. 536,066

9 Claims. (Cl. 310—164)

This invention relates, generally, to the construction of electric motors and it has particular relation to small synchronous motors of the type employed for operating timing devices, such as time switches, clocks, and the like.

Among the objects of the invention are: To provide a motor that is simple and efficient in operation and which can be readily and economically manufactured and used; to mount a cover for the motor overlying the rotor with a press fit on an outer cylindrical pole member of the motor; to maintain a predetermined air gap between the pole tips of the stator; to maintain such an air gap by employing a pole tip centering or positioning ring within the cylindrical pole member and secured thereto with a press fit; to provide radial slots in the pole tip centering or positioning ring through which pole tips project from an inner pole member into registry and spaced relation with pole tips from the outer pole member; and to prevent rotation of the rotor of the motor in one direction and to permit rotation in the opposite direction.

Other objects of this invention will, in part, be obvious and in part appear hereinafter.

This invention is disclosed in the embodiment thereof shown in the accompanying drawings and it comprises the features of construction, combination of elements and arrangement of parts which will be exemplified in the construction hereinafter set forth and the scope of the application of which will be indicated in the appended claims.

For a more complete understanding of the nature and scope of this invention reference can be had to the following detailed description, taken together with the accompanying drawings, in which.

Figure 1:
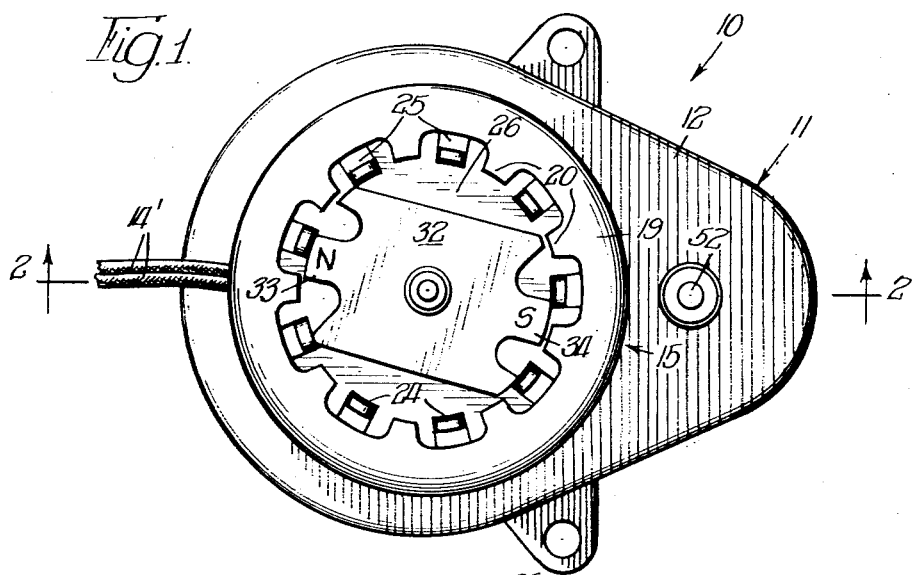
Figure 1 is a top plan view of a motor construction in which the present invention is embodied, the cover having been removed, and the showing being at double full size.
Figure 2:
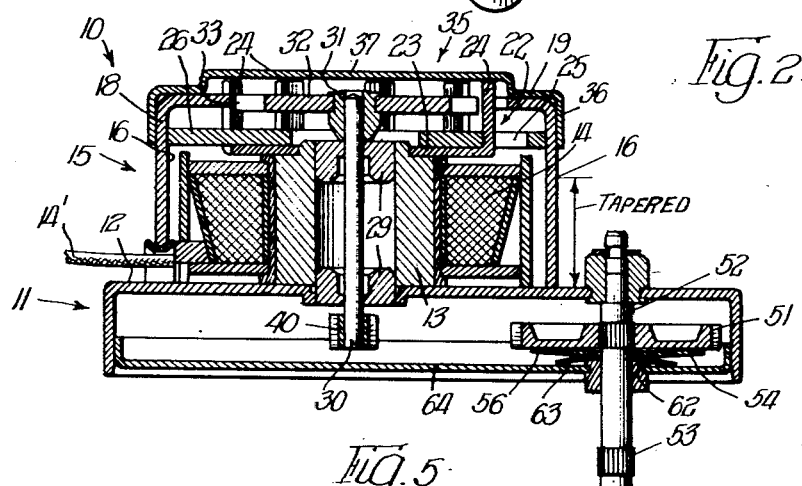
Figure 2 is a vertical sectional view taken generally along the line 2—2 of Figure 1.

Referring now particularly to Figures 1 and 2 of the drawings, it will be observed that reference character 10 designates, generally, a motor construction in which the present invention is embodied. The motor 10 is intended, as indicated above, for driving various timing devices such as time switches for washing machines, clothes dryers and the like. Also it can be employed for driving timing devices for operating time switches for other purposes and for operating clock mechanisms, if desired. The motor 10 includes a gear housing 11 that is formed of magnetic material and the central portion thereof provides a back plate 12 for the motor. Extending upwardly from the back plate 12 of the gear housing 11 is a core 13 of magnetic material having a winding 14 positioned therearound. Leads 14' serve to interconnect the winding 14 to a suitable source of alternating current such as 115 volt 60 cycle source.

Surrounding the core 13 and winding 14 and coextensive therewith is an outer pole member that is indicated, generally, at 15. The outer pole member 15 is formed of magnetic material and it is secured, as by welding, to the back plate 12. For a purpose which will be apparent presently the outer pole member 15 is tapered slightly from its lower end where it joins with the back plate 12. For illustrative purposes it is pointed out that the diameter of the inner surface of the outer pole member 15 where it joins the back plate 12 may be of the order of 1.515". It is tapered inwardly over a distance of .437" to a diameter of 1.503". Thus the taper extends for a substantial distance over the inner surface of the outer pole member 15. The remaining portion beyond the tapered portion provides a cylindrical inner surface. As shown in Figure 2 the tapered portion extends to 16 from the back plate 12. The inner surface of the remaining portion of the outer pole member 15, as indicated, is cylindrical. This portion is indicated at 18.

The polar construction for the outer pole member 15 is completed by an integral radially inwardly extending flange 19 from the cylindrical section 18 having pole tips 20, Figure 1, projecting radially inwardly. These pole tips 20 can be formed with a high degree of accuracy by the die that forms the pole member 15. In accordance with the present invention different numbers of pole tips 20 can be employed. In the embodiment illustrated nine pole tips 20 are used. However, it will be understood that other numbers of pole tips can be employed without departing from the spirit and scope of this invention.

Figure 4:
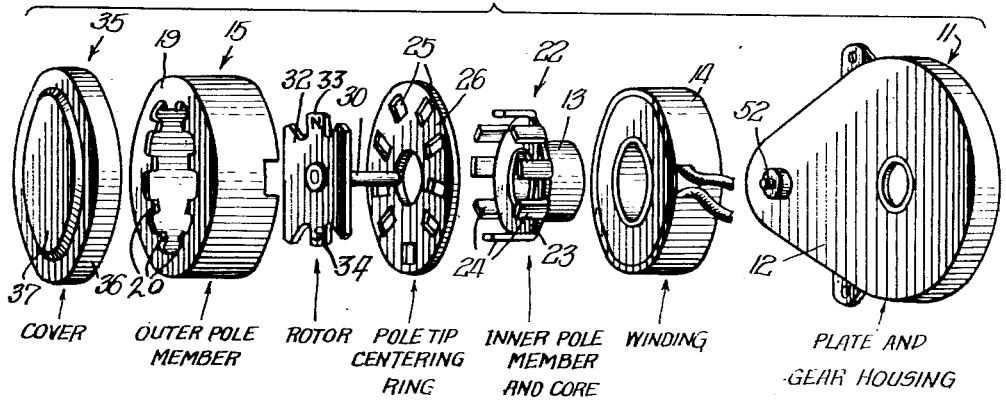
Figure 4 is an exploded perspective view of the important parts of the motor construction.

At the end of the core 13 remote from the back plate 12 is an inner pole member that is indicated, generally, at 22. It is shown more clearly in Figures 2 and 4 of the drawings. The inner pole member 22 is formed of magnetic material and includes an annular portion 23 which is staked to the core 13 and extends radially outwardly therefrom. At the outer periphery of the annular portion 23 pole tips 24 are formed. They extend normal to the annular portion 23 through radial slots 25 positioned wholly within a pole tip centering or positioning ring 26 formed preferably of non-magnetic material such as aluminum. As shown, the number of pole tips 24 equals the number of radial slots 25 and the number of pole tips 20 on the outer pole under 15. The pole tips 24 and radial slots 25 are spaced angularly equidistant from the pole tips 20. It will be observed that the inner surfaces of the pole tips 20 and of the pole tips 24 lie along a circle in a plane that extends at right angles to the longitudinal axis of the core 13.

The pole tip centering or positioning ring 26 serves to space accurately the pole tips 24 on the inner pole member 22 from the pole tips 20 on the outer pole member 15 and thereby provide uniform air gaps therebetween. The ring 26 has diameter slightly greater than the inside diameter of the cylindrical section 18 of the outer pole member 15. Because of the tapered portion of the outer pole member 15, the ring 26 can be readily inserted. Then it is moved by a press to the position shown in Figure 2 where it has a press fit with the inner surface of the cylindrical section 18 and it is thereby held securely therein. Since the radial slots 25 can be accurately punched in the ring 26 and since it can be accurately positioned with a press fit in the outer pole member 15, the pole tips 24 are correspondingly accurately positioned with respect to the pole tips 20 and thus uniform air gaps therebetween are maintained.

Bearings 29 are positioned at the ends of the core 13 for rotatably mounting a shaft 30 which has a hub or bushing 31 pressed on the upper end as shown in Figure 2. Secured to the hub or bushing 31 by staking is a rotor 32 that is formed of magnetic material and is permanently magnetized as indicated at the pole tips 33 and 34. On energization of the winding 14 with a suitable alternating current, the rotor 32 will be caused to rotate as a result of the magnetic field generated along the circle including the pole tips 20 and 26. The arrangement of the rotor 32 with the permanently magnetized pole tips 33 and 34 in combination with the pole tips 20 and 24 on the pole members 15 and 22 energized by the alternating magnetic flux from the winding 14 provides a self starting motor. However, it is likely to start in either direction and means are provided, as described hereinafter, to permit rotation only in one direction.

It is desirable to provide a dust-proof housing for the open upper end of the outer pole member 15. For this purpose a cover 35, preferably formed of aluminum, is employed. As shown in Figure 2 the cover 35 has a depending flange 36 which is arranged to have a press fit with the outer surface of the cylindrical portion 18 of the outer pole member 15. A raised central portion 37 of the cover 35 overlies the portions of the pole tips 24 that project beyond the plane of the rotor 32 and of the flange 19.

Figure 5:
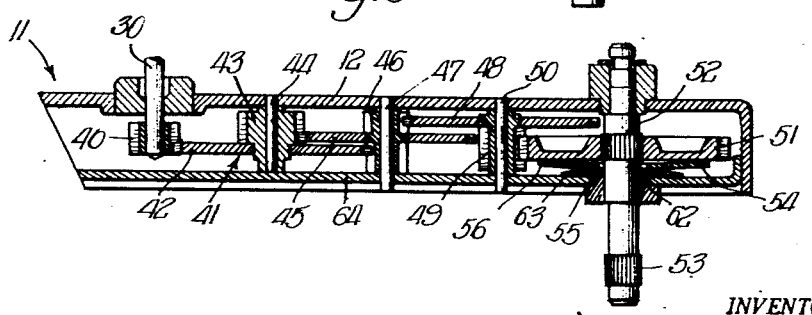
Figure 5 is a vertical sectional view showing the layout of the gear train within the gear case, the gears and pinions being shown as if they were in alignment for convenience.

At the lower end of the shaft 30, as shown in Figures 2 and 5 of the drawings, there is a pinion 40 which has a press fit with the shaft. The pinion 40 is arranged to drive a gear train, shown generally at 41, which is positioned within the gear housing 11. The gear train 41 includes a gear 42 that meshes with the pinion 40 and has mounted for conjoint rotation therewith a pinion 43, both being mounted on a pin 44 that is carried by the back plate 12. The pinion 43 has a gear 45 meshing therewith and it in turn operates a pinion 46, both being mounted for rotation on a pin 47 that is carried by the back plate 12. The pinion 46 drives a gear 48 with which a final pinion 49 rotates, both being mounted on a pin 50 carried by the back plate 12. The final pinion 49 drives a final gear 51 which is fast on a shaft 52 that is journaled in the back plate 12. The shaft 52 is knurled, as indicated at 53, for receiving a suitable driving pinion (not shown).

Figure 3:
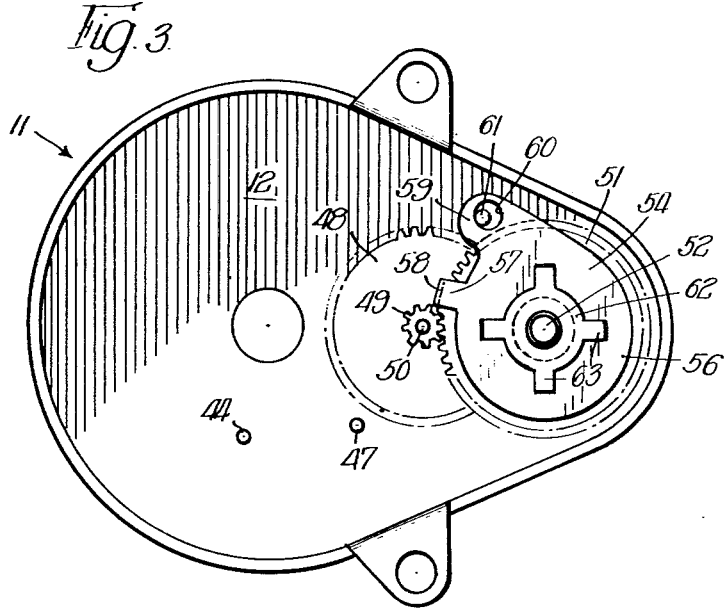
Figure 3 is a bottom plan view of the motor construction with the cover for the gear case removed and certain of the gears and pinions of the gear train omitted.

In view of the fact that the rotor 32 is likely to start in either direction and since it usually is essential that it be permitted to rotate only in one direction, means are provided for accomplishing this operation. Embodied in this invention are mechanical means for insuring that the rotor 32 will rotate only in one direction. For this purpose, as shown in Figure 3, a directional plate 54 is employed. As illustrated, the directional plate 54 is generally circular in shape and has a diameter that is somewhat less than the diameter of the final gear 51. As shown in Figures 2 and 5 of the drawings the central portion 55 of the directional 54 is dished outwardly so that only the outer portion 56 bears against the flat surface of the final gear 51. Formed integrally with the directional plate 54 is an arm 57 having an end portion 58 extending normal thereto and into the path of the teeth on the final pinion 49. When the end portion 58 is disposed in the path of these teeth, rotation of the final pinion 49 in a clock-wise direction is prevented.

It is desirable to limit the extent of rocking movement of the directional plate 54 which is loosely mounted on the shaft 52. For this purpose an arm 59 is formed integrally with the directional plate 54 and it has a relatively large diameter aperture 60 through which a stationary pin 61 of substantially smaller diameter projects. The stationary pin 61 is carried by the back plate 12. As shown in Figure 3, the relationship between the pin 61 and the aperture 60 is such as to limit the extent that the directional plate 54 can rock about the shaft 52 and swing with it the end portion 58 out of the path of the teeth on the final pinion 49. In order to urge the directional plate 54 to frictional driving engagement with the final gear 51, a spring disc 62, Figures 2, 3 and 5 is employed. The spring disc 62 is dished at its central portion and it has radially extending arms 63 which bear against the inside of a cover 64 that overlies the gear housing 11, as shown in Figures 2 and 5 of the drawings. With the cover 64 in place the spring disc 62 functions to hold the directional plate 54 in frictional driving engagement with the flat surface of the final gear 51.

In operation on energization of the winding 14 with suitable alternating current a magnetic field is generated along the circle containing the pole tips 20 and 26. Should the direction in which the rotor 32 initially starts to rotate be opposite that which it is desired that it should rotate, the final gear 51 will be rotated in a counter-clock-wise direction, as viewed in Figure 3. Since the directional plate 54 is held in frictional engagement therewith, it will rock in a counter-clock-wise direction to bring the end portion 58 into the path of the teeth of the final pinion 49 and thus prevent further rotation thereof in a clock-wise direction. Under these circumstances, since the rotor 32 is prevented from rotating in one direction, it will rebound to rotate in the opposite direction. When this takes place, the final gear 51 is rotated in a clock-wise direction and it carries therewith the directional plate 54 in the same direction until further rocking movement thereof is prevented by engagement with the pin 61. Thereafter, as long as the winding 14 remains energized, with alternating current, the rotor 32 continues to rotate at a speed in synchronism with the alternating current determined by the number of pole tips on the pole members 15 and 24 as will be understood readily.

Since certain changes can be made in the foregoing construction and different embodiments of the invention can be made without departing from the spirit and scope thereof, it is intended that all matters shown in the accompanying drawings and descirebd hereinbefore shall be interpreted as illustrative and not in a limiting sense.

What is claimed as new is:

1. An electric motor construction comprising, in combination, a magnetic core, a winding on said core, a magnetic plate extending radially from one end of said core; an outer pole member of magnetic material having a ring portion extending from said plate and axially coextensive with said core, with the end remote from said plate having a radially inwardly directed flange provided with radially inwardly extending pole tips; an annular non-magnetic pole tip centering ring spaced inwardly from said flange, secured to said ring portion of said outer pole member, located adjacent the other end of said core, and having openings equal in number to the number of said pole tips and spaced angularly therefrom; an inner pole member of magnetic material having an annular portion secured to said other end of said core, overlying said pole tip centering ring, and having a plurality of pole tips extending from said annular portion through said openings in said pole tip centering ring, and thereby accurately spaced from said pole tips on said outer pole member and providing therewith magnetic poles of opposite polarity disposed around a circle, and a shaft rotatably mounted in said core and carrying at one end a bar type permanent magnet rotor having pole tips at the ends and rotatable within said circle defined by said pole tips of said outer and inner pole members.

2. An electric motor construction comprising, in combination, a magnetic core, a winding on said core, a magnetic plate extending radially from one end of said core; an outer pole member of magnetic material having a ring portion extending from said plate and axially coextensive with said core, with the end remote from said plate having a radially inwardly directed flange provided with radially inwardly extending pole tips the inner surface of said ring portion tapering inwardly from said plate for a substantial distance with the remaining inner surface being cylindrical; an annular non-magnetic pole tip centering ring spaced inwardly from said flange, having a press fit with the cylindrical portion of said inner surface of said outer pole member, located adjacent the other end of said core, and having openings equal in number to the number of said pole tips and spaced angularly therefrom; an inner pole member of magnetic material having an annular portion secured to said other end of said core, overlying said pole tip centering ring, and having a plurality of pole tips extending from said annular portion through said openings in the said pole tip centering ring and thereby accurately spaced from said pole tips on said outer pole member and providing therewith magnetic poles of opposite polarity disposed around a circle, and a shaft rotatably mounted in said core and carrying at one end a bar type permanent magnet rotor having pole tips at the ends and rotatable within said circle defined by said pole tips of said outer and inner pole members.

3. An electric motor construction comprising, in combination, a magnetic core, a winding on said core, a magnetic plate extending radially from one end of said core; an outer pole member of magnetic material having a ring portion extending from said plate and axially coextensive with said core, with the end remote from said plate having a radially inwardly directed flange provided with radially inwardly extending pole tips; an annular non-magnetic pole tip centering ring spaced inwardly from said flange, secured to said ring portion of said outer pole member, located in the plane of the other end of said core, and having radial slots wholly within the body of said ring equal in number to the number of said pole tips and spaced angularly equidistant therefrom; an inner pole member of magnetic material having an annular portion secured to said other end of said core, overlying said pole tip centering ring, and having a plurality of pole tips extending from said annular portion through said slots in said pole tip centering ring and providing with said pole tips of said outer pole member magnetic poles of opposite polarity disposed around a circle, and a shaft rotatably mounted in said core and carrying at one end a bar type permanent magnet rotor having pole tips at the ends and rotatable within said circle defined by said pole tips of said outer and inner pole members.

4. An electric motor construction comprising, in combination, a magnetic core, a winding on said core, a magnetic plate extending radially from one end of said core; an outer pole member of magnetic material having a ring portion extending from said plate and axially coextensive with said core, with the end remote from said plate having a radially inwardly directed flange provided with radially inwardly extending pole tips the inner surface of said ring portion tapering inwardly from said plate for a substantial distance with the remaining inner surface being cylindrical; an annular non-magnetic pole tip centering ring spaced inwardly from said flange, having a press fit with the cylindrical portion of said inner surface of said outer pole member, located in the plane of the other end of said core, and having radial slots wholly within the body of said ring equal in number to the number of said pole tips and spaced angularly equidistant therefrom; an inner pole member of magnetic material having an annular portion secured to said other end of said core, overlying said pole tip centering ring, and having a plurality of pole tips extending from said annular portion through said slots in said pole tip centering ring beyond said flange of said outer pole member with the inner surfaces of the last mentioned pole tips lying along a circle along which the inner surfaces of said pole tips on said flange also lie, and a shaft rotatably mounted in said core and carrying at one end a bar type permanent magnet rotor having pole tips at the ends and rotatable within said circle defined by said pole tips of said outer and inner pole members.

5. An electric motor construction comprising, in combination, a magnetic core, a winding on said core, a magnetic plate extending radially from one end of said core; an outer pole member of magnetic material having a ring portion extending from said plate and axially coextensive with said core, with the end remote from said plate having a radially inwardly directed flange provided with radially inwardly extending pole tips; an annular non-magnetic pole tip centering ring spaced inwardly from said flange, secured to said ring portion of said outer pole member, located adjacent the other end of said core, and having openings equal in number to the number of said pole tips and spaced angularly therefrom; an inner pole member of magnetic material having an annular portion secured to said other end of said core, overlying said pole tip centering ring, and having a plurality of pole tips extending from said annular portion through said openings in said pole tip centering ring and providing with said pole tips of said outer pole member magnetic poles of opposite polarity disposed around a circle, a shaft rotatably mounted in said core and carrying at one end a bar type permanent magnet rotor having pole tips at the ends and rotatable within said circle defined by said pole tips of said outer and inner pole members, and a cup shaped cover of non-magnetic material overlying said rotor and having a press fit with said end of said ring portion of said outer pole member remote from said plate.

6. An electric motor construction comprising, in combination, a magnetic core, a winding on said core, a magnetic plate extending radially from one end of said core; an outer pole member of magnetic material having a ring portion extending from said plate and axially coextensive with said core, with the end remote from said plate having a radially inwardly directed flange provided with radially inwardly extending pole tips; an annular non-magnetic pole tip centering ring spaced inwardly from said flange, secured to said ring portion of said outer pole member, located adjacent the other end of said core, and having openings equal in number to the number of said pole tips and spaced angularly therefrom; an inner pole member of magnetic material having an annular portion secured to said other end of said core, overlying said pole tip centering ring, and having a plurality of pole tips extending from said annular portion through said openings in said pole tip centering ring, and providing with said pole tips of said outer pole member magnetic poles of opposite polarity disposed around a circle, a shaft rotatably mounted in said core and carrying at one end a bar type permanent magnet rotor having pole tips at the ends and rotatable within said circle defined by said pole tips of said outer and inner pole members, a pinion fast on the other end of said shaft, and means cooperating with said pinion acting to prevent rotation of said pinion and said rotor in one direction and to permit rotation thereof in the other direction.

7. An electric motor construction comprising, in combination, a magnetic core, a winding on said core, a magnetic plate extending radially from one end of said core; an outer pole member of magnetic material having a ring portion extending from said plate and axially coextensive with said core, with the end remote from said plate having a radially inwardly directed flange provided with radially inwardly extending pole tips; an annular non-magnetic pole tip centering ring spaced inwardly from said flange, secured to said ring portion of said outer pole member, located adjacent the other end of said core, and having openings equal in number to the number of said pole tips and spaced angularly therefrom; an inner pole member of magnetic material having an annular portion secured to said other end of said core, overlying said pole tip centering ring, and having a plurality of pole tips extending from said annular portion through said openings in said pole tip centering ring and providing with said pole tips of said outer pole member magnetic poles of opposite polarity disposed around a circle, a shaft rotatably mounted in said core and carrying at one end a bar type permanent magnet rotor having pole tips at the ends and rotatable within said circle defined by said pole tips of said outer and inner pole members, a pinion fast on the other end of said shaft, a gear train driven by said pinion including a final pinion and a final gear driven thereby and fast on a drive shaft; a directional plate loosely mounted on said drive shaft, overlying said final gear, having a radially extending arm with an end portion normal thereto and movable into the path of the teeth on said final pinion, and an apertured radially extending second arm; a stationary pin having a diameter substantially less than that of the aperture in said second arm and extending therethrough to limit the rocking movement of said directional plate, and a spring urging said directional plate into frictional engagement with said final gear.

8. An electric motor construction comprising, in combination, a magnetic core, a winding on said core, a magnetic plate extending radially from one end of said core; an outer pole member of magnetic material having a ring portion extending from said plate and axially coextensive with said core, with the end remote from said plate havnig a radially inwardly directed flange provided with radially inwardly extending pole tips the inner surface of said ring portion tapering inwardly from said plate for a substantial distance with the remaining inner surface being cylindrical; an annular non-magnetic pole tip centering ring spaced inwardly from said flange, having a press fit with the cylindrical portion of said inner surface of said outer pole member, located in the plane of the other end of said core, and having radial slots wholly within the body of said ring equal in number to the number of said pole tips and spaced angularly equidistant therefrom; an inner pole member of magnetic material having an annular portion secured to said other end of said core, overlying said pole tip centering ring, and having a plurality of pole tips extending from said annular portion through said slots in said pole tip centering ring beyond said flange of said outer pole member with the inner surfaces of the last mentioned pole tips lying along a circle along which the inner surfaces of said pole tips on said flange also lie, a shaft rotatably mounted in said core and carrying at one end a bar type permanent magnet rotor having pole tips at the ends and rotatable within said circle defined by said pole tips of said outer and inner pole members, a pinion fast on the other end of said shaft, a gear train driven by said pinion including a final pinion and a final gear driven thereby and fast on a drive shaft; a directional plate loosely mounted on said drive shaft, overlying said final gear, having a radially extending arm with an end portion normal thereto and movable into the path of the teeth on said final pinion, and an apertured radially extending second arm; a stationary pin having a diameter substantially less than that of the aperture in said second arm and extending therethrough to limit the rocking movement of said directional plate, and a spring urging said directional plate into frictional engagement with said final gear.

9. An electric motor construction comprising, in combination, a magnetic core, a winding on said core, a magnetic plate extending radially from one end of said core; an outer pole member of magnetic material having a ring portion extending from said plate and axially coextensive with said core, with the end remote from said plate having a radially inwardly directed flange provided with radially inwardly extending pole tips, the inner surface of said ring portion tapering inwardly from said plate for a substantial distance with the remaining inner surface being cylindrical; an annular non-magnetic pole tip centering ring spaced inwardly from said flange, having a press fit with the cylindrical portion of said inner surface of said outer pole member, located in the plane of the other end of said core, and having radial slots wholly within the body of said ring equal in number to the number of said pole tips and spaced angularly equidistant therefrom; an inner pole member of magnetic material having an annular portion secured to said other end of said core, extending radially coextensively with said pole tip centering ring, and having a plurality of pole tips extending from said annular portion through said slots in said pole tip centering ring beyond said flange of said outer pole member with the inner surfaces of the last mentioned pole tips lying along a circle along which the inner surfaces of said pole tips on said flange also lie; a shaft journaled in said core and carrying at one end a bar type permanent magnet rotor having pole tips at the ends and rotatable in the plane of said pole tips on said outer and inner pole members, a cup shaped cover of non-magnetic material overlying said rotor and having a press fit with said end of said ring portion of said outer pole member remote from said plate, a pinion fast on the other end of said shaft, a gear train driven by said pinion including a final pinion and a final gear driven thereby and fast on a drive shaft; a directional plate loosely mounted on said drive shaft, overlying said final gear with its central portion dished away therefrom, having a radially extending arm with an end portion normal thereto and movable into the path of the teeth on said final pinion, and an apertured radially extending second arm; a stationary pin having a diameter substantially less than that of the aperture in said second arm and extending therethrough to limit the rocking movement of said directional plate, and a spring urging the outer undished portion of said directional plate into frictional engagement with said final gear.

References Cited in the file of this patent

UNITED STATES PATENTS

| Number | Name | Date |
|---|---|---|
| 1,933,590 | Holtz et al. | Nov. 7, 1933 |
| 1,966,897 | Lofgren | July 17, 1934 |
| 2,080,371 | Hammond | May 11, 1937 |
| 2,323,035 | Hansen et al. | June 29, 1943 |
| 2,353,305 | Haydon | July 11, 1944 |
| 2,450,955 | Hansen et al. | Oct. 12, 1948 |
| 2,492,197 | Schellens | Dec. 27, 1949 |
| 2,721,281 | Morganson | Oct. 18, 1955 |
| 2,722,297 | Gates | Nov. 1, 1955 |

FOREIGN PATENTS

| Number | Country | Date |
|---|---|---|
| 449,075 | Great Britain | June 19, 1936 |
| 630,171 | Great Britain | Oct. 6, 1949 |